US006938677B2

(12) United States Patent
Yamakawa et al.

(10) Patent No.: US 6,938,677 B2
(45) Date of Patent: Sep. 6, 2005

(54) AIR-CONDITIONER OF CONSTRUCTION MACHINERY

(75) Inventors: Atsushi Yamakawa, Tokyo (JP); Kazushige Tasaki, Tokyo (JP); Eiji Akahane, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 10/485,288

(22) PCT Filed: May 2, 2003

(86) PCT No.: PCT/JP03/05613

§ 371 (c)(1),
(2), (4) Date: Jan. 29, 2004

(87) PCT Pub. No.: WO03/095249

PCT Pub. Date: Nov. 20, 2003

(65) Prior Publication Data

US 2004/0187509 A1 Sep. 30, 2004

(30) Foreign Application Priority Data

May 14, 2001 (JP) ........................................ 2002-138268

(51) Int. Cl.[7] .................................................. B60H 1/32
(52) U.S. Cl. ...................... 165/42; 62/244; 237/12.3 A
(58) Field of Search .............................. 62/244; 165/42, 165/43; 237/12.3

(56) References Cited

U.S. PATENT DOCUMENTS 2,052,471 A * 8/1936 Hula ....................... 296/146.8
4,072,487 A * 2/1978 Irwin .......................... 62/244
4,097,085 A * 6/1978 Nelson ................... 296/190.05
4,503,749 A * 3/1985 Kuhn et al. ................. 454/136
4,612,975 A * 9/1986 Ikari ............................ 165/43
4,874,036 A * 10/1989 Masuda ....................... 165/42
5,443,208 A * 8/1995 Potter ..................... 237/12.3 A
5,911,624 A * 6/1999 Stauffer ....................... 454/158

FOREIGN PATENT DOCUMENTS

| JP | U 64-11813 | 1/1989 |
| JP | A 05-301516 | 11/1993 |
| JP | A 2002-503579 | 2/2002 |
| WO | WO 99/42314 | 8/1999 |

* cited by examiner

Primary Examiner—William E. Tapolcai
(74) Attorney, Agent, or Firm—Oliff & Berridge, PLC

(57) ABSTRACT

The invention provides an air-conditioning apparatus that maximizes the space in an operator's cab and provides a comfortable working environment for the operator of a construction machine. The body unit of the air-conditioning apparatus is disposed under the floor surface of the cab, cold air and hot air ducts are connected to the body unit, and routed under the floor of the cab to be passed through the floor surface and taken out into the inside of the cab using cold air and hot air outlets disposed at both left and right sides at the front part of the cab. Also, by providing two evaporators, air of different temperatures can be blown through the left and right outlets.

18 Claims, 6 Drawing Sheets

AIR-CONDITIONER OF CONSTRUCTION MACHINERY

BACKGROUND OF THE INVENTION

1. Field of Invention

The invention belongs to the technical field of an air-conditioning apparatus to be incorporated in a construction machine, such as a hydraulic excavators, etc.

2. Description of Related Art

Recently, an air-conditioning apparatus has become a widely accepted accessory in the operator's cab of a construction machine, such as a hydraulic excavator, etc., in order to improve the operator's working environment. Conventionally, a body unit incorporates a heat exchanger for cold air, a heat exchanger for hot air and a blower, etc., and comprises an air-conditioning apparatus has been disposed below or behind a seat in an operator's cab. A duct that becomes an outlet for the air-conditioned air produced by the body unit is pipe-arranged, for example, toward the right side or rear side within the operator's cab. However, the body unit and ducts occupy a considerable portion of the space within the operator's cab.

Disposed in the operator's cab are various members and devices, such as a console box in which control levers, etc. are provided, operation pedals, a monitoring device, etc., a seat on which an operator sits, and the above-described air-conditioning apparatus. Therefore, Applicants have identified a need for effectively using the space in an operator's cab by saving the space taken by an air-conditioning apparatus, wherein the invention solves the problems.

Furthermore, it is common that, in a construction machine, an entrance door is provided at the left side of the operator's cab. Therefore, it is difficult to dispose a duct for the above-described air-conditioning apparatus at the left side of the operator's cab in such a machine. Accordingly, there is the case where there is no outlet in the door to provide a defrosting outlet.

In addition, where one side of the operator is exposed to sunlight, it is more comfortable for the operator if the temperatures of the cold air blown from the left and right ducts are different, wherein the temperature at the side which is exposed to sunlight is made slightly lower, or cooler, while the temperature at the opposite side is made slightly higher, or warmer. However, the prior art devices have a problem in that the temperature of the cold air simultaneously blown from the left and right ducts cannot be made different from one another. This point is also an object of the invention.

SUMMARY OF THE INVENTION

The invention addresses the above-described problems. In the invention, a body unit of an air-conditioning apparatus, into which heat exchangers for cold air and hot air are incorporated, is provided under the floor of a cab and ducts, which become outlets of air-conditioned air produced by the body unit, are routed under the floor of a cab and are taken out into the inside of the operator's cab.

With such a structure, it is not necessary to secure space for disposing the body unit of an air-conditioning apparatus and ducts thereof in the operator's cab. As a result, the space in the operator's cab can be effectively utilized, and at the same time the degree of freedom in the layout for disposing the ducts can be increased as potential advantages achieved by the invention.

In the invention, an opening is provided on the floor surface of the operator's cab, and a part of the body unit disposed under the floor of the operator's cab protrudes into the operator's cab through the opening, whereby the portion protruding into the operator's cab can be protected.

Furthermore, in the invention outlets of cold air and/or hot air ducts are disposed at both the left and right sides at the front part of the operator's cab, whereby the temperature around an operator can be uniformly maintained in a stabilized state, and a comfortable work environment can be provided. In addition, because an outlet for hot air, which functions for defrosting, is provided at both left and right sides, defrosting performance of not only the front window of the operator's cab but also the left and right windows thereof can be further improved.

In the invention, first and second cold air heat exchangers are incorporated into the body unit, cold air from the respective cold air heat exchangers is separately mixed with hot air from a hot air heat exchanger, and air of different temperatures is blown from the left and right outlets, whereby the working environment of the operator can be made even more comfortable.

Thus, the invention is useful and effective in cases where, when an air-conditioning apparatus is disposed in civil engineering and/or construction machinery, such as hydraulic excavators, etc., the space in an operator's cab can be effectively utilized, the temperature surrounding an operator can be evenly maintained in a stabilized state, and the working environment of the operator can be made comfortable.

BRIEF DESCRIPTION OF THE DRAWINGS

The invention will be described with reference to the drawings, in which.

DETAILED DESCRIPTION OF PREFERRED EMBODIMENTS

Figure 1:
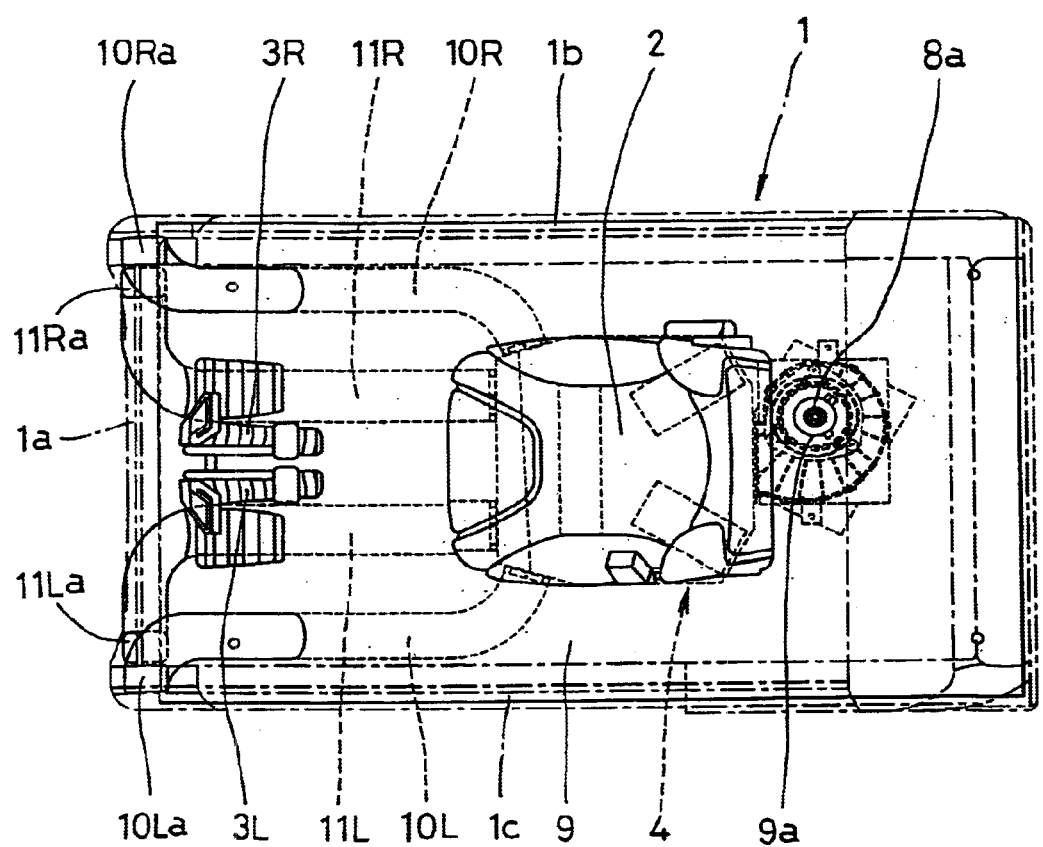
FIG. 1 is a plan view showing a simplified inside of a cab.
Figure 2:
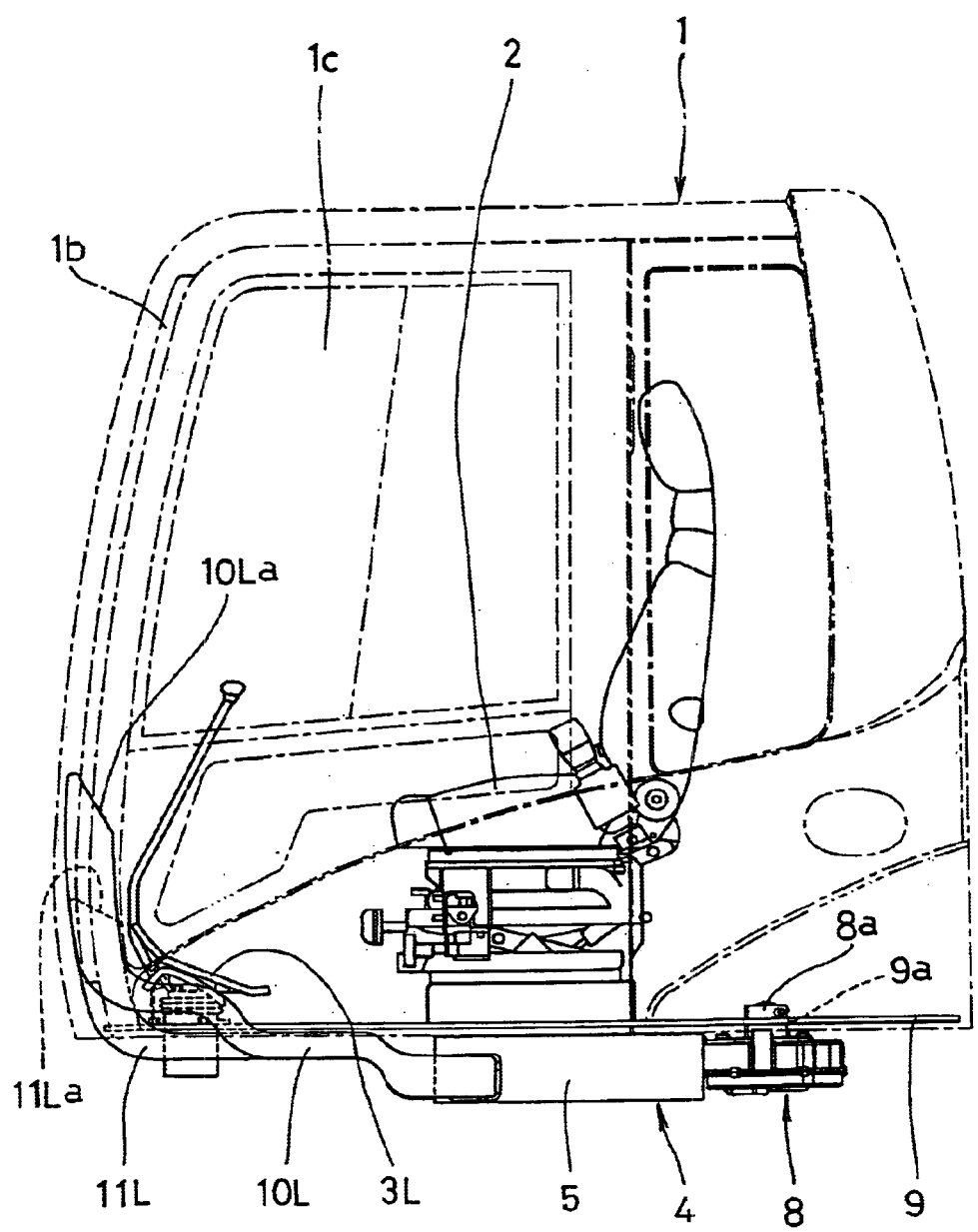
FIG. 2 is a side elevational view showing the simplified inside of the cab.
Figure 3:
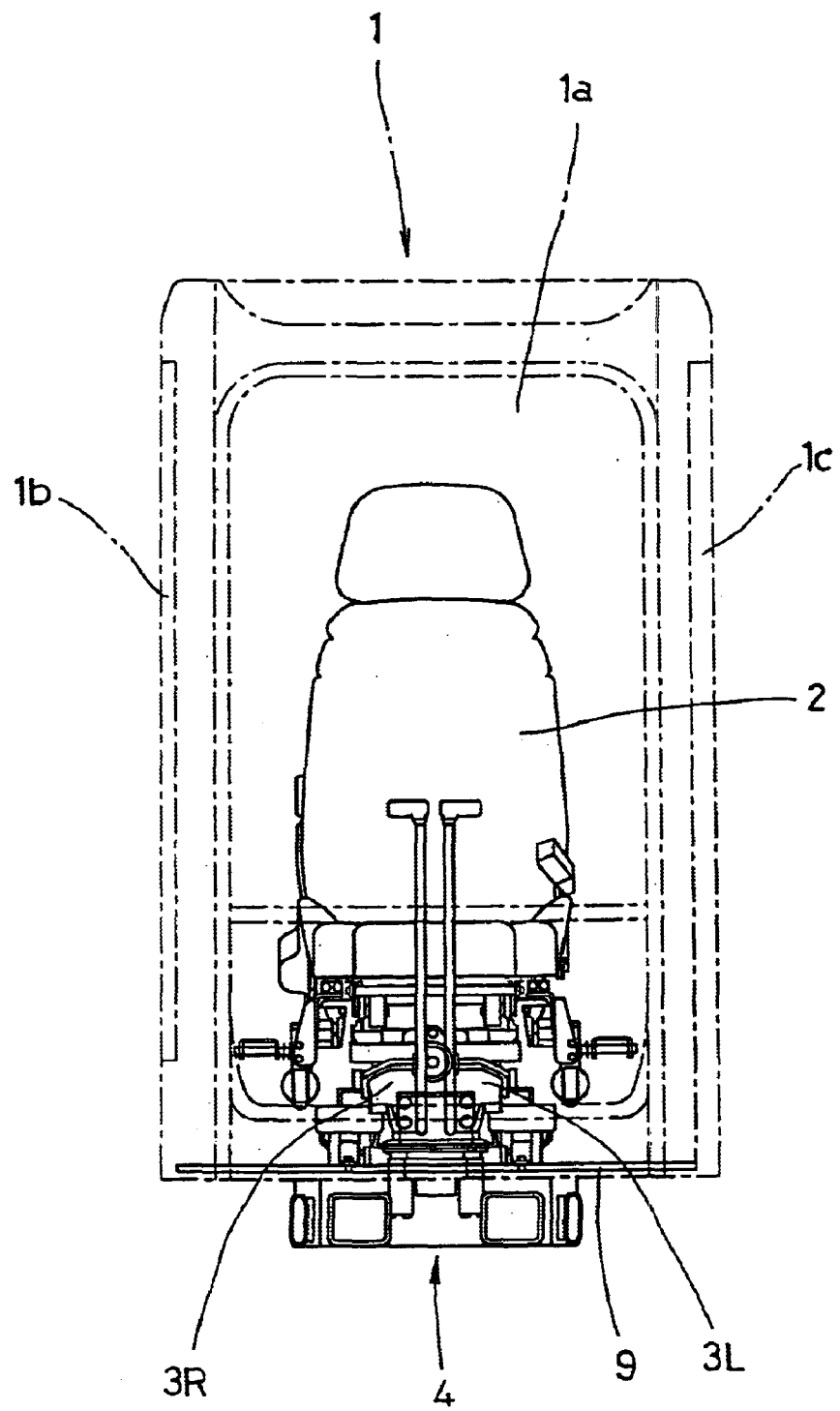
FIG. 3 is a front elevational view showing the cab with a part thereof omitted.

In the drawings, reference number 1 denotes a cab (corresponding to the operator's cabin of the invention) of a construction machine, such as a hydraulic excavator, etc. A front window 1a is provided at the front part of the cab 1, a right window 1b is provided at the right side part thereof, and a left door 1c is provided at the left side part thereof, respectively. Furthermore, various members and devices, such as a seat 2 on which an operator sits, left and right operation pedals 3L, 3R, a console box (not illustrated) equipped with control levers, a monitoring device, a controller, etc., are disposed in the cab 1.

Figure 4:
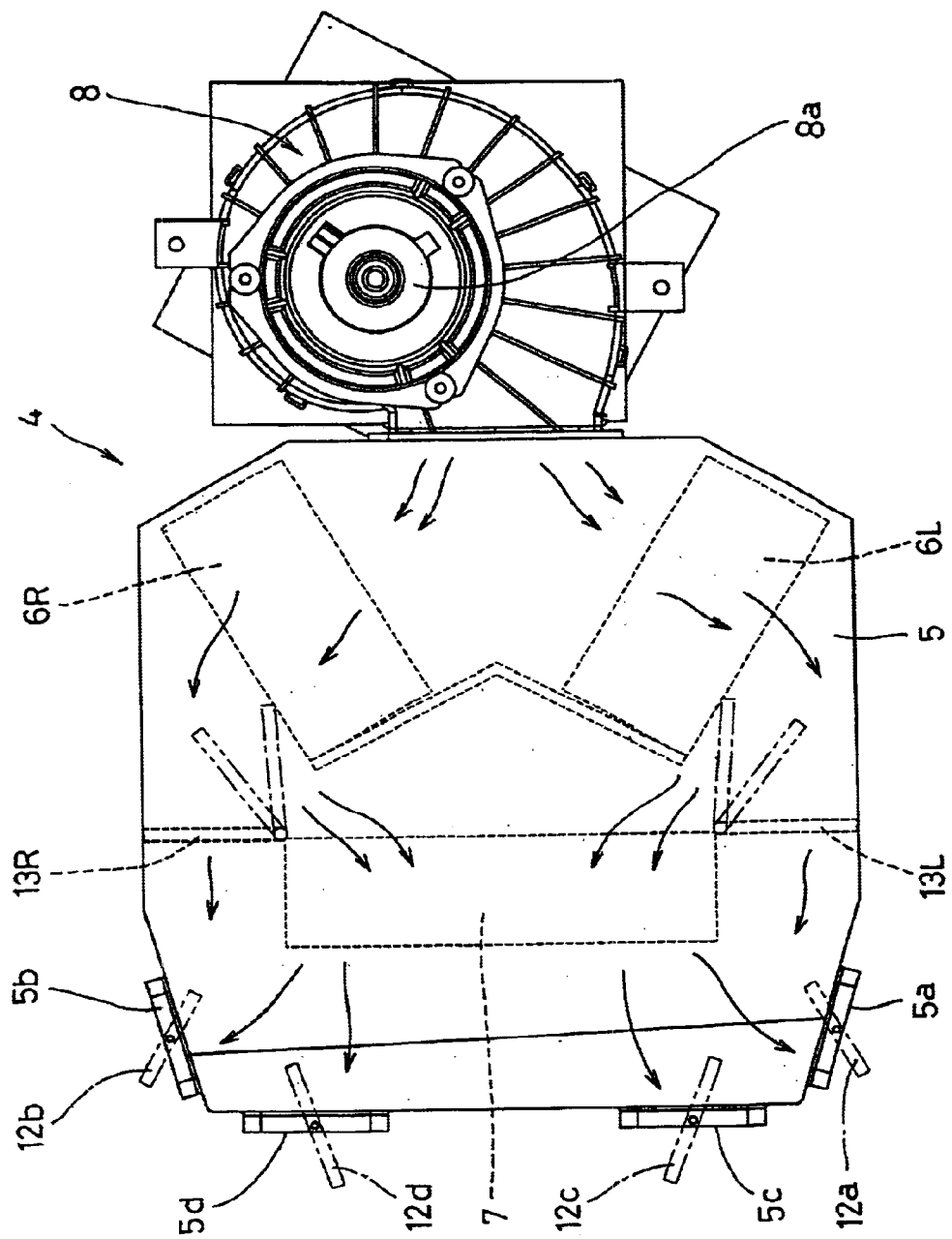
FIG. 4 is a plan view showing a body unit.
Figure 5:
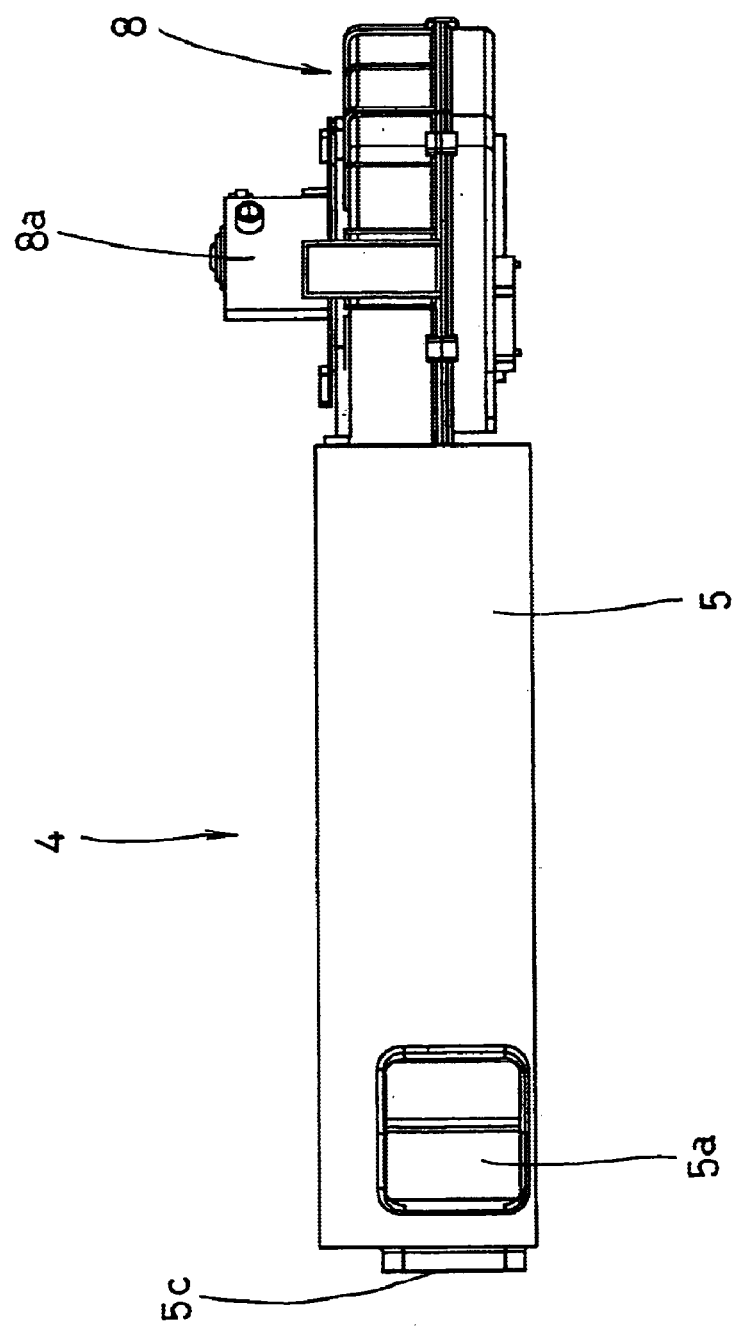
FIG. 5 is a side elevational view showing the body unit.
Figure 6:
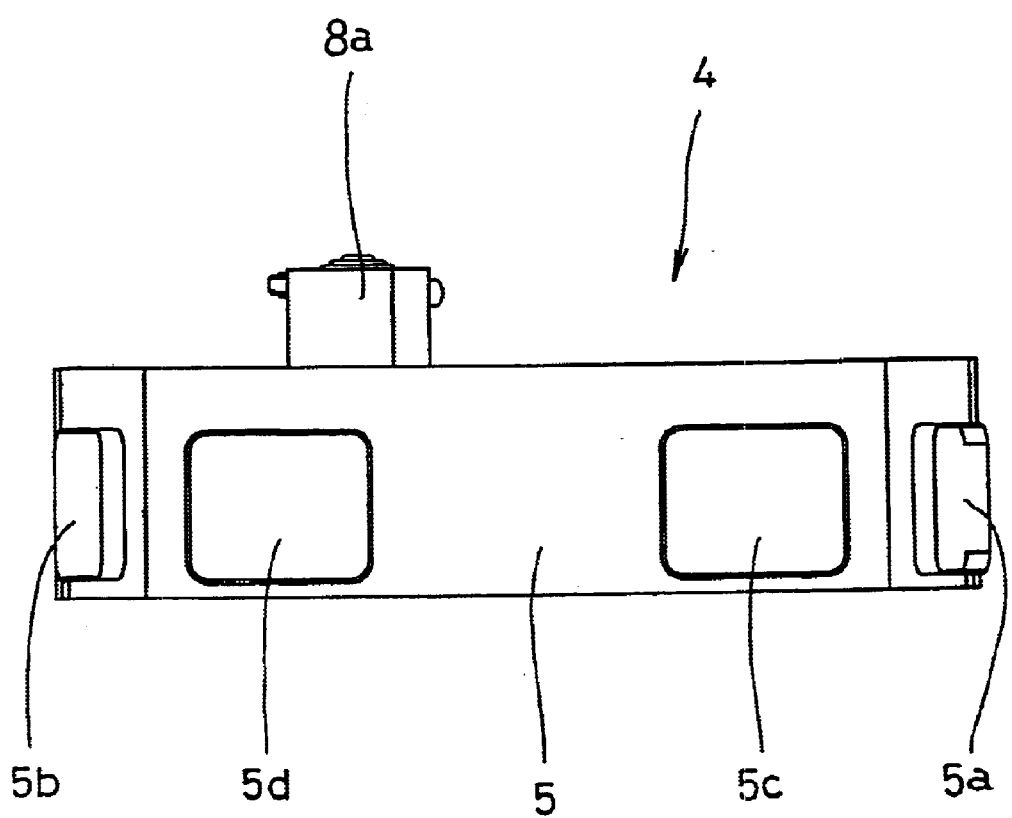
FIG. 6 is a front elevational view showing the body unit.

On the other hand, reference number 4 (FIG. 4) denotes a body unit of an air-conditioning apparatus. The body unit 4 comprises a box-shaped thin type casing body 5 in which a pair of left and right evaporators 6L, 6R(corresponding to a heat exchanger for cold air conditioning to the invention), a beater core 7 (corresponding to a heat exchanger for hot air according to the invention), etc., are incorporated. A blower unit 8 is further incorporated in the rear portion of the casing body 5 and made integral therewith. The body unit 4 is attached on the underside of the floor plate 9 of the cab 1 in a state where the casing body 5 is positioned below the seat 2 and the blower unit 8 is positioned essentially behind and below the seat. A motor 8a, that powers the blower unit 8, protrudes from an opening 9a provided on the floor plate 9 to the inside of the cab 1. Accordingly, the motor 8a is accommodated in the cab 1, whereas the body unit 4 is accommodated below the floor. Thus, the motor 8a can be protected from muddy water, etc.

Furthermore, left and right connection ports 5a, 5b for cold air, to which the base portions of left and right cold air ducts 10L, 10R are connected, are formed at the front part of the left and right sides of the casing body 5, and left and right connection ports 5c, 5d for hot air, to which the base portions of left and right hot air ducts 11L, 11R are connected, are formed at the front side of the casing body 5. Connection port dampers 12a, 12b, 12c, 12d, the opening degree of which is adjustable, are provided at the respective connection ports 5a, 5b, 5c, 5d, so that the blowing amount from the respective connection ports 5a, 5b, 5c, 5d to the ducts 10L, 10R, 11L, 11R can be adjusted.

The above-described left and right cold air ducts 10L, 10R are routed below the floor plate 9 of the cab 1 from the left and right cold air connection ports 5a, 5b to the left and right sides of the cab 1. They extend forward, and are taken out to the inside of the cab 1 from the surface of the floor plate 9 to the outside of the left and right operation pedals 3L, 3R. Thus, the ducts 10L, 10R are disposed so as to reach the left and right side parts of the cab 1. In addition, the cold air outlets 10La, 10Ra are connected to the tip end portions of the ducts 10L, 10R. The cold air ducts 10L, 10R are devised so that air cooled by the left and right evaporators 6L, 6R blows from the cold air outlets 10La, 10Ra toward the upper body of an operator.

Furthermore, the left and right hot air ducts 11L, 11R are routed below the floor of the cab 1 from the left and right hot air connection ports 5c, 5d toward the front part of the cab 1 and taken out from the forward surface of the floor plate 9 forward of the left and right operation pedals 3L, 3R to the inside of the cab 1. After that, the ducts 11L, 11R are routed so as to extend outward in the left and right directions along the front side part of the cab 1. The hot air outlets 11La, 11Ra are connected to the tip end portions thereof. The hot air ducts 11L, 11R are constructed so that air heated by the heater core 7 is blown from the hot outlets 11La, 11Ra toward an operator's feet, the front window 1a, right side window 1b and door 1c. Accordingly, the ducts 11L, 11R function for both heating and defrosting.

On the other hand, left and right guide dampers 13L, 13R are rotatably supported on the casing body 5. They can be displaced to a heating position (shown by a dotted line in FIG. 4) where air sent from the blower unit 8, and passed through the respective left and right evaporators 6L, 6R, is caused to flow into the heater core 7, a cooling position (shown by a one-dashed chain line in FIG. 4) where streams of air from the respective left and right evaporators 6L, 6R are prevented from flowing to the heater core 7, and a mixing position (shown by a two-dashed chain line in FIG. 4; the streams of air at the mixing position being illustrated by the arrows in FIG. 4) which is located at an intermediate position between the cooling position and heating position and permits a part of the air coming from the respective left and right evaporators 6L, 6R to flow into the heater core 7. Further, the guide dampers 13L, 13R are controlled so that they are positioned at the cooling position when cooling is carried out, and at the heating position when heating is carried out, and are controlled so that they are positioned at the mixing position when performing bi-level control. Therefore, in the bi-level control, cold air whose coldness is tempered is blown from the cold air outlets 10La, 10Ra, and hot air whose warmth is tempered is blown from the hot air outlets 11La, 11Ra. Furthermore, in the bi-level control, the left and right guide dampers 13L, 13R are structured so that the rotating positions thereof can be separately controlled, whereby it becomes possible to alter the mixing ratio of cold and hot air, which are mixed via the respective left and right guide dampers 13L, 13R. Moreover, by controlling the opening degree of the above-described connection dampers 12a, 12b, 12c, 12d, the temperature and amount of air blown from the left and right cold air and hot air outlets 10La, 10Ra, 11La, 11Ra can be set so that they are different at the left and right sides.

In such a structure as described above, the body unit 4 of the air-conditioning apparatus is accommodated below the floor surface 9 of the cab 1, and at the same time, the left and right cold air and hot air ducts 10L, 10R, 11L, 11R, which are connected to the body unit 4 and routed below the floor of the cab 1, reach the front part of the cab 1. Furthermore, the ducts are taken from the front part of the cab 1 into the inside thereof, and are connected to the cold air and hot air outlets 10La, 10Ra, 11La, 11Ra, which are disposed at both left and right forward sides in the cab 1.

As a result, it is not necessary to provide a space for disposing the body unit 4 of the air-conditioning apparatus and ducts 10L, 10R, 11L, 11R within the cab 1. Therefore the space for disposing other members and devices and an operating space of an operator can be increased, and the space in the cab 1 can be effectively utilized.

Furthermore, because the ducts 10L, 10R, 11L, 11R are routed below the floor of the cab 1, the degree of freedom for the piping layout can be increased as it is possible to easily route pipes at the left side of the cab 1, the side at which the door 1c is installed. Accordingly, because the hot air outlets 11La, 11Ra which function for defrosting both left and right sides of the cab 1 can be provided, the defrosting performance with respect to the door 1c can be further improved. Also, because the cold air outlets 10La, 10Ra are disposed at the left and right sides of the cab 1, it is possible to evenly maintain the temperature surrounding an operator in a stabilized state, and a comfortable working environment can be brought about.

Furthermore, in such a structure, the motor portion 8a of the blower unit 8, that is part of the body unit 4, protrudes from the opening 9a opened in the floor plate 9 of the cab 1 into the inside of the cab 1 and is accommodated in the cab 1. As described above, because the motor portion 8a is accommodated in the cab 1, through the opening 9a in the floor plate 9, the motor portion 8a can be protected from impacts from contact with muddy water or pebbles, etc., although the bulk of the body unit 4 is accommodated below the floor of the cab 1. In addition, portions that are caused to protrude into the cab 1 are not limited to the motor portion 8a. Any portions for which protection is necessary can be accommodated in the cab 1.

Also, a pair of left and right evaporators 6L, 6R are provided in the body unit 4. Thus, air cooled by the separate left and right evaporators 6L, 6R may be separately mixed with air heated by the heater core 7 in the bi-level control. As a result, for example, in the case where the upper part of an operator's body is exposed to sunlight, the blowing temperature from the left and right outlets 10La, 10Ra, 11La, 11Ra can be separately set so that the temperature at the side exposed to sunlight is made slightly lower and the temperature at the side opposed thereto, i.e., shaded, is made slightly higher, wherein the working environment of an operator can be made even more comfortable.

What is claimed is:

1. An air-conditioning apparatus for a construction machine, comprising:
    a body unit of the air-conditioning apparatus;
    heat exchangers for cold air and hot air incorporated in the body unit, the body unit mounted under the floor of an operator's cab;
    ducts which become outlets of air-conditioned air produced by the body unit are routed under the floor of the operator's cab and are passed through the floor into the inside of the operator's cab; and
    an opening is provided in the floor surface of the operator's cab, with a part of the body unit protruding into the operator's cab through the opening.

2. The air-conditioning apparatus as set forth in claim 1, wherein the outlets of cold air and/or hot air ducts are disposed at both left and right sides at the front part of the operator's cab.

3. The air-conditioning apparatus as set forth in claim 2, wherein, although first and second cold air heat exchangers are incorporated into the body unit, cold air from the respective cold air heat exchangers is separately mixed with hot air from a hot air heat exchanger, whereby air of different temperatures is blown out from left and right outlets.

4. A vehicle, comprising:
    an operator cab with a floor plate; and
    an air conditioning unit beneath the floor plate and mounted to a lower surface of the floor plate, the air conditioning unit comprising:
        a blower unit;
        a motor powering the blower unit;
        a body unit; and
        a duct system extending from the body unit beneath the floor plate substantially along both sides of the operator cab and opening into the operator cab at a front thereof, wherein the floor plate of the operator cab has an opening that receives the motor such that the motor is housed within the operator cabin.

5. The vehicle according to claim 4, wherein the body unit has therein:
    a pair of evaporators;
    a heater element; and
    a guide damper associated with each evaporator to direct air flow emerging from the associated evaporator.

6. The vehicle according to claim 4, wherein the duct system comprises:
    a cold air duct extending from an associated evaporator along a respective side of the operator cabin;
    a hot air duct extending from the body unit toward a front of the operator cabin along each side of and substantially parallel to a center line or longitudinal axis of the operator cabin; and
    a hot air exhaust duct and a cold air exhaust duct extending into the operator cabin at respective front corners of the operator cabin, wherein the floor plate has duct openings to allow the cold air ducts and hot air ducts to connect with the respective cold air exhaust ducts and hot air exhaust ducts.

7. The vehicle according to claim 5 wherein the duct system comprises:
    a cold air duct extending from an associated evaporator along a respective side of the operator cabin;
    a hot air duct extending from the body unit toward a front of the operator cabin along each side of and substantially parallel to a center line or longitudinal axis of the operator cabin; and
    a hot air exhaust duct and a cold air exhaust duct extending into the operator cabin at respective front corners of the operator cabin, wherein the floor plate has duct openings to allow the cold air ducts and hot air ducts to connect with the respective cold air exhaust ducts and hot air exhaust ducts.

8. The vehicle according to claim 4, wherein the body unit further comprises a damper at each duct of the duct system extending from the body unit.

9. The vehicle according to claim 5, wherein the body unit further comprises a damper at each duct of the duct system extending from the body unit.

10. The vehicle according to claim 7, wherein the body unit further comprises a damper at each duct of the duct system extending from the body unit.

11. The vehicle according to claim 8, further comprising a controller that controls the opening of each damper.

12. The vehicle according to claim 9, further comprising a controller that controls the opening of each damper.

13. The vehicle according to claim 10, further comprising a controller that controls the opening of each damper.

14. An air-conditioner used in a vehicle having a floor plate, the air-conditioner unit comprising:
    a blower unit;
    a motor powering the blower unit;
    a body unit; and
    a duct system extending from the body unit beneath the floor plate substantially along both sides of the operator cab and opening into the operator cab at a front thereof, wherein the floor plate of the operator cab has an opening that receives the motor such that the motor is housed within the operator cabin.

15. The vehicle according to claim 14, wherein the body unit has therein:
    a pair of evaporators;
    a heater element; and
    a guide damper associated with each evaporator to direct air flow emerging from the associated evaporator.

16. The air-conditioner according to claim 15, wherein the duct system comprises:
    a cold air duct extending from an associated evaporator along a respective side of the operator cabin;
    a hot air duct extending from the body unit toward a front of the operator cabin along each side of and substantially parallel to a center line or longitudinal axis of the operator cabin; and
    a hot air exhaust duct and a cold air exhaust duct extending into the operator cabin at respective front corners of the operator cabin, wherein the floor plate has duct openings to allow the cold air ducts and hot air ducts to connect with the respective cold air exhaust ducts and hot air exhaust ducts.

17. The air-conditioner according to claim 16, wherein the body unit further comprises a damper at each duct of the duct system extending from the body unit.

18. The air-conditioner according to claim 17, further comprising a controller that controls the opening of each damper.

* * * * *